(12) United States Patent
Shigeta (10) Patent No.: US 11,865,435 B2
(45) Date of Patent: *Jan. 9, 2024

(54) METHOD FOR SHUFFLING PLAYING CARDS

(71) Applicant: ANGEL GROUP CO., LTD., Shiga (JP)

(72) Inventor: Yasushi Shigeta, Shiga (JP)

(73) Assignee: ANGEL GROUP CO., LTD., Shiga (JP)

( * ) Notice: Subject to any disclaimer, the term of this patent is extended or adjusted under 35 U.S.C. 154(b) by 406 days.

This patent is subject to a terminal disclaimer.

(21) Appl. No.: 16/756,981

(22) PCT Filed: Oct. 19, 2018

(86) PCT No.: PCT/JP2018/038925
§ 371 (c)(1),
(2) Date: Apr. 17, 2020

(87) PCT Pub. No.: WO2019/078322
PCT Pub. Date: Apr. 25, 2019

(65) Prior Publication Data
US 2020/0376365 A1    Dec. 3, 2020

(30) Foreign Application Priority Data

Oct. 21, 2017  (JP) ................................. 2017-215961

(51) Int. Cl.
*A63F 1/12* (2006.01)
*A63F 1/02* (2006.01)
(Continued)

(52) U.S. Cl.
CPC .................. *A63F 1/12* (2013.01); *A63F 1/02* (2013.01); *A63F 1/062* (2013.01); *G06F 7/58* (2013.01);
(Continued)

(58) Field of Classification Search
CPC .... A63F 1/12; A63F 1/02; A63F 1/062; A63F 2001/022; A63F 2009/2485; G06F 7/58; G06F 9/52; G06F 9/3877
See application file for complete search history.

(56) References Cited

U.S. PATENT DOCUMENTS 4,770,421 A    9/1988 Hoffman
5,000,453 A    3/1991 Stevens et al.
(Continued)

FOREIGN PATENT DOCUMENTS

AU    2016204768 A1    7/2016
CN       1882377 A     12/2006
(Continued)

OTHER PUBLICATIONS

U.S. Office Action dated May 5, 2022 issued in U.S. Appl. 16/165,769.
(Continued)

*Primary Examiner* — Michael D Dennis
(74) *Attorney, Agent, or Firm* — NORTON ROSE FULBRIGHT US LLP (57) ABSTRACT

A shuffling system of the present invention includes multiple shuffling devices which are connected in series to one another, and multiple CPUs which are independent from one another, and are connected with the respective multiple shuffling devices, in which each of the multiple CPUs is used to shuffle the cards across the multiple shuffling devices, so that the cards are arranged randomly, and further, even if the information about the shuffle in each shuffling device is stolen due to an unauthorized access to the multiple CPUs, or the like, it becomes difficult to identify shuffled cards to which the stolen information is allocated in all the shuffling devices, and therefore the possibility that the arrangement of the shuffled cards is recognized is reduced.

29 Claims, 7 Drawing Sheets

(51) Int. Cl.
  *A63F 1/06* (2006.01)
  *G06F 9/52* (2006.01)
  *G06F 7/58* (2006.01)
  *G06F 9/38* (2018.01)
  *A63F 9/24* (2006.01)

(52) U.S. Cl.
  CPC .............. *G06F 9/3877* (2013.01); *G06F 9/52* (2013.01); *A63F 2001/022* (2013.01); *A63F 2009/2485* (2013.01)

(56) References Cited

U.S. PATENT DOCUMENTS

| | | | |
|---|---|---|---|
| 6,250,632 | B1 | 6/2001 | Albrecht |
| 6,477,251 | B1 | 11/2002 | Szrek et al. |
| 6,651,981 | B2 | 11/2003 | Grauzer et al. |
| 7,537,216 | B2 | 5/2009 | Soltys et al. |
| 7,766,333 | B1 | 8/2010 | Stardust et al. |
| 8,371,583 | B2 | 2/2013 | Shigeta |
| 8,387,983 | B2 * | 3/2013 | Shigeta ............... A63F 1/10 273/293 |
| 9,474,957 | B2 * | 10/2016 | Haushalter ............. A63F 1/12 |
| 9,573,047 | B1 * | 2/2017 | Riordan ................. A63F 1/14 |
| 2002/0165794 | A1 | 11/2002 | Ishihara |
| 2005/0110210 | A1 | 5/2005 | Soltys et al. |
| 2007/0024449 | A1 | 2/2007 | Bilyeu et al. |
| 2007/0298865 | A1 | 12/2007 | Soltys |
| 2007/0298868 | A1 | 12/2007 | Soltys |
| 2010/0314834 | A1 | 12/2010 | Shigeta |
| 2010/0327525 | A1 | 12/2010 | Shigeta |
| 2013/0259224 | A1 | 10/2013 | Lee et al. |
| 2014/0027979 | A1 * | 1/2014 | Stasson ............... H05K 999/00 273/149 R |
| 2014/0033660 | A1 | 2/2014 | Shigeta |
| 2014/0353913 | A1 | 12/2014 | Shigeta |
| 2015/0042042 | A1 | 2/2015 | Shigeta |
| 2015/0258420 | A1 | 9/2015 | Shigeta |
| 2017/0072293 | A1 | 3/2017 | Kelly et al. |
| 2019/0060738 | A1 | 2/2019 | Riordan |

FOREIGN PATENT DOCUMENTS

| | | | |
|---|---|---|---|
| CN | 101239236 | A | 8/2008 |
| CN | 101249307 | A | 8/2008 |
| CN | 101873880 | A | 10/2010 |
| CN | 101890226 | A | 11/2010 |
| CN | 102764501 | A | 11/2012 |
| CN | 103287637 | A | 9/2013 |
| CN | 103368729 | A | 10/2013 |
| CN | 103566578 | A | 2/2014 |
| CN | 203620226 | U | 6/2014 |
| CN | 104023800 | A | 9/2014 |
| EP | 2228106 | A1 | 9/2010 |
| JP | 64-032881 | A | 2/1989 |
| JP | H01032881 | A | 2/1989 |
| JP | 2002-288458 | A | 10/2002 |
| JP | 2011-024603 | A | 2/2011 |
| JP | 2011-245417 | A | 12/2011 |
| JP | 2014-031217 | A | 2/2014 |
| JP | 2014083414 | A | 5/2014 |
| JP | 2015037550 | A | 2/2015 |
| KR | 101537431 | B1 | 7/2015 |
| WO | 02101630 | A1 | 12/2002 |
| WO | 2009/069708 | A1 | 6/2009 |
| WO | 2012042823 | A1 | 4/2012 |

OTHER PUBLICATIONS

Print out of website document, Playing Card Types and Specification (URL:https://www.makeplayingcards.com/printed-cardtypes.aspx), by Make Playing Cards.com (MPC) archived on Mar. 21, 2016.

U.S. Office Action dated Apr. 12, 2021 issued in U.S. Appl. No. 16/165,769.

Brent R.P., Fast and Reliable Random Number Generators for Scientific Computing, extended abstract. In: Dongarra J., Madsen K.,Wasniewski J. (eds) Applied Parallel Computing. State of the Art in Scientific Computing. PARA 2004. Lecture Notes in Computer Science, vol. 3732. Springer, Berlin, Heidelberg (Year: 2006).

Macao Office Action dated Oct. 21, 2019 issued in corresponding MO patent application I/001587.

European Search Report dated Jul. 3, 2019 issued in corresponding EP Application 18201538.8.

Invention Publication col. 22 No. 48 dated Apr. 29, 2019 issued in corresponding Filipino Application 1/2018/000315.

International Search Report dated Jan. 15, 2019 issued in family/corresponding PCT Application PCT/JP2018/038925.

Japanese Office Action dated Apr. 5, 2022 issued in JP Application 2019-549352.

Korean Office Action dated Oct. 29, 2020 issued in KR patent application 10-2018-0125242.

U.S. Final Office Action dated Dec. 10, 2021 issued in U.S. Appl. No. 16/165,769.

CN Office Action dated Nov. 30, 2021 issued in CN Application 201811220490.0.

Chinese Office Action dated Jan. 13, 2023 issued in CN Application 201880067048.0.

Korean Office Action dated Apr. 6, 2023 issued in KR Application 10-2020-7010332.

* cited by examiner

METHOD FOR SHUFFLING PLAYING CARDS

CROSS-REFERENCE TO RELATED APPLICATIONS

This application is a national phase application under 35 U.S.C. § 371 of International Application No. PCT/JP2018/038925 filed Oct. 19, 2018, which claims priority to Japanese Application No. 2017-215961 filed Oct. 21, 2017, the entire contents of each of which are specifically incorporated by reference herein without disclaimer.

BACKGROUND OF THE INVENTION

Field of the Invention

The present invention relates to a method of shuffling playing cards used for card games, and more particularly, to shuffled playing cards which are completely randomly arranged by performing a shuffle multiple times independently using multiple card shuffling devices and to a shuffling method thereof.

Description of the Related Art

In poker, baccarat, bridge, blackjack, and other card games, a dealer sets one or more decks (six to nine or ten decks) of playing cards in a card shooter or the like and deals cards to game players by shooting the cards one by one out of the card shooter or the like. In so doing, to ensure fairness of the games, the cards not arranged with regularity but arranged at random need to be dealt. Therefore, a game host has to shuffle the playing cards sufficiently randomly before the playing cards are set in the card shooter, and arrangement of the playing cards set in the card shooter must not be known to players and the dealer, or anyone.

International Publication No. WO2009/069708 discloses a method of manufacturing and shipping packages of playing cards shuffled in random and unique arrangement order using a shuffling device in a shuffling process. It is conceivable that to use the cards randomly arranged for card games, a game host shuffles the cards using the shuffling device before the start of play, and International Publication No. WO2009/069708 has an object to provide shuffled playing cards and a manufacturing method thereof which eliminate the need for a game host to shuffle cards before games by taking a lot of time as well as eliminate the possibility of cheating. Furthermore, International Publication No. WO2009/069708 discloses that the shuffling devices perform a process of shuffling the cards in a random manner multiple times, and therefore the shuffled playing cards can be arranged more randomly.

In a conventional system, a method of shuffling cards using a set of random numerical values output from a random generator based on a command from a CPU (processor) in a shuffling device has been widely used. In this case, the information about the set of random numerical values is stolen or leaks to the outside due to an unauthorized access to the CPU (processor), or the like, resulting in the information about the arrangement of the shuffled playing cards being illegally acquired, and therefore there is a problem of possible cheating.

The present invention has been made in view of the above problems, and has an object to provide a system in which multiple shuffling devices are connected in series to one another, and shuffle cards using sets of random numerical values output from respective random generators based on commands from multiple CPUs (processors) which are independent from one another, and wiredly or wirelessly connected with the respective multiple shuffling devices, and then the subsequent shuffling devices connected in series shuffle the cards in the same manner, this shuffling process is performed across the multiple shuffling devices, so that the cards are arranged randomly. Furthermore, even if the information about the sets of random numerical values output from the multiple random generators is stolen due to an unauthorized access to the multiple CPUs (processors), or the like, it becomes difficult to identify shuffled cards to which the stolen information is allocated in all the shuffling devices, and therefore the possibility that the arrangement of the shuffled cards is recognized is reduced.

The present invention further has an object to provide a system in which in each of the multiple shuffling devices, the cards are shuffled using the set of random numerical values selected from the sets of random numerical values output for each multiple sets from the random generator based on a command from the CPU (processor), and therefore even if the information about the multiple sets of random numerical values in the random generator is stolen due to an unauthorized access to the CPU (processor), or the like, it becomes difficult to identify the selected and used set of random numerical values by which the cards have been shuffled, and therefore the possibility that the arrangement of the shuffled cards is recognized is further reduced.

SUMMARY OF THE INVENTION

To solve the above-described problems of the conventional art, a shuffling system of the present invention comprises: a playing card set made up of a predetermined number of decks; multiple shuffling devices which shuffle the playing card set; multiple sequencers or controllers which are independent from one another and control operations of the multiple shuffling devices, respectively; and multiple processors which are independent from one another and control the multiple sequencers or controllers, wherein the multiple processors have one or more random generators which are independent from one another, each of the sequencers or controllers are configured to control the corresponding shuffling device using a set of numerical values output from the corresponding random generator based on a command from the corresponding processor; each of the sequencers or controllers controls the operation of the corresponding shuffling device so that cards of the card set are sorted one by one in a random order using the set of numerical values output from the corresponding random generator; the shuffling system is configured to shuffle the card set using the multiple shuffling devices so that the cards of the card set are arranged randomly.

An integrated product of the number of pockets in each of the multiple shuffling devices and the number of the multiple shuffling devices may be equal to or larger than the total number of cards of the card set.

The processor may output multiple sets of random numerical values from the corresponding random generator, and the sequencer or controller may be configured to select and use one out of the multiple sets of random numerical values to control the corresponding shuffling device.

A final shuffling device which finally shuffles the cards of the card set among the multiple shuffling devices further includes gathering means which mechanically gathers the cards sorted by the final shuffling device, and the shuffled playing cards may be completely manufactured by gathering the sorted cards by the gathering means as a single stack and packing the shuffled card set into a package by an automatic packaging machine.

A unique ID may be generated for each of the individual shuffled card sets, and may be associated with the shuffled card set.

The present invention includes shuffled playing cards manufactured using the above-described shuffling system.

The shuffled playing cards may be double packed into the package by the automatic packaging machine.

To solve the above-described problems of the conventional art, a shuffling system of the present invention is a system for shuffling cards made up of one or more decks, which comprises: multiple shuffling devices which shuffle the cards; multiple sequencers or controllers which control operations of the multiple shuffling devices, respectively; and multiple processors which control the multiple sequencers or controllers, wherein the multiple processors have random generators, respectively, and the multiple shuffling devices are configured to shuffle one set of cards made up of one or more decks using sets of numerical values commanded by random generators of at least different processors.

To solve the above-described problems of the conventional art, a shuffling system of the present invention is a system for shuffling cards made up of one or more decks comprises: multiple shuffling devices which shuffle the cards; multiple sequencers or controllers which independently control operations of the multiple shuffling devices, respectively; and a processor which controls the multiple sequencers or controllers, wherein the processor has a random generator, and the multiple shuffling devices are controlled by the multiple sequencers or controllers which are independent from one another, the multiple sequencers or controllers are configured to control the multiple shuffling devices using a set of random numerical values commanded by the random generator, the processor outputs the multiple sets of random numerical values from the random generator, and each of the multiple sequencers or controllers are configured to select and use one out of the multiple sets of random numerical values, so that one set of cards made up of one or more decks is shuffled.

An integrated product of the number of pockets during shuffling by each of the multiple shuffling devices and the number of the multiple shuffling devices may be equal to or larger than the total number of cards of the card set.

The processor may output multiple sets of random numerical values from the corresponding random generator, and the sequencer or controller may be configured to select and use one out of the multiple sets of random numerical values to control the corresponding shuffling device.

A final shuffling device which finally shuffles the cards of the card set among the multiple shuffling devices further includes gathering means which mechanically gathers the cards sorted by the final shuffling device, and the shuffled playing cards may be completely manufactured by gathering the sorted cards by the gathering means as a single stack and packing the shuffled card set into a package by an automatic packaging machine.

A unique ID may be generated for each of the individual shuffled card sets, and may be associated with the shuffled card set.

The present invention includes shuffled playing cards manufactured using the above-described shuffling system.

The shuffled playing cards may be double packed into the package by an automatic packaging machine.

DETAILED DESCRIPTION OF THE PREFERRED EMBODIMENTS

Before describing embodiments of a shuffling system of the present invention, a mechanism in a shuffling device provided with multiple pockets will be described in which the cards are arranged randomly by performing multiple times a shuffle by which a set of cards to be shuffled is sorted one by one into any of the pockets.

Figure 1A:
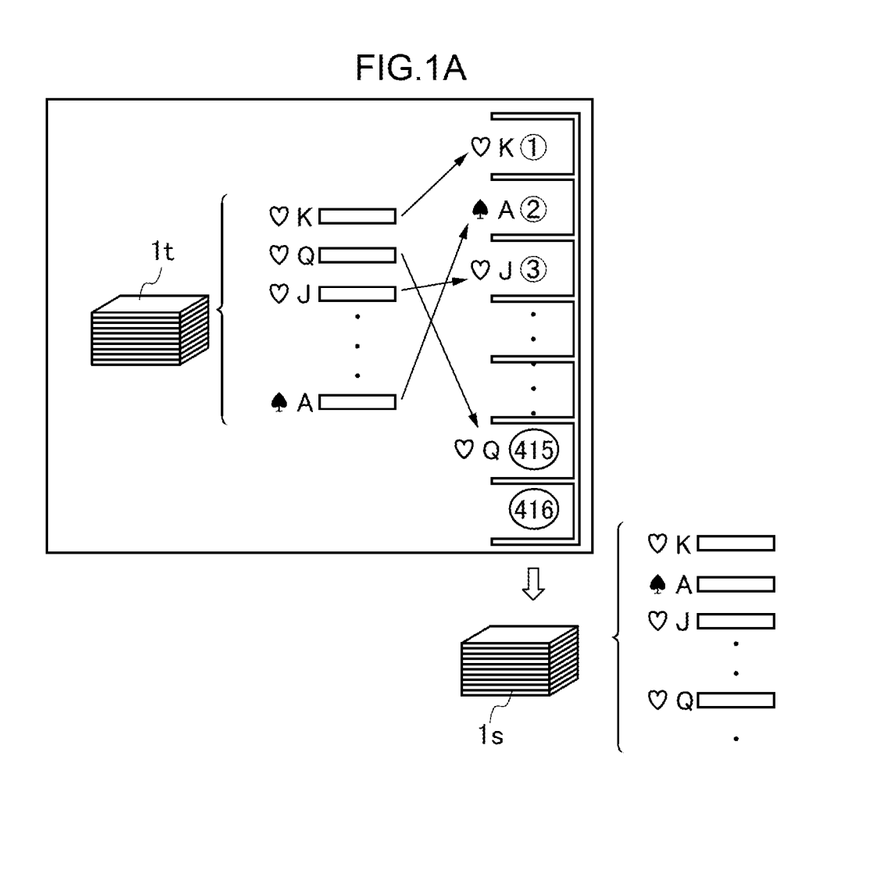
FIG. 1(A) is a diagram illustrating a mechanism in which cards are arranged randomly by shuffling (when the number of pockets is equal to or larger than the number of cards).

For example, it is assumed that the cards of eight decks (52 cards×eight decks=416 cards) are shuffled and arranged randomly. As illustrated in FIG. 1(A), in the shuffling device provided with 416 pockets, when the cards are sorted one by one into any of the 416 pockets, and the sorted cards are gathered in order from the pockets, all arrangements of cards can be provided, and the cards can be arranged completely randomly. Note that in the conventional system, a method of using a set of random numerical values output from a random generator based on a command from a CPU (processor) has been widely used to determine which one of 416 pockets each card is to be sorted into (the details will be described later). In this case, since the CPU (processor) has the information about which one of 416 pockets each card is to be sorted into (PC knows), if this information leaks to the outside due to an unauthorized access to the CPU (processor), or the like, the information about the arrangement of the cards sorted into the 416 pockets is illegally acquired, which may lead to cheating.

Figure 1B:
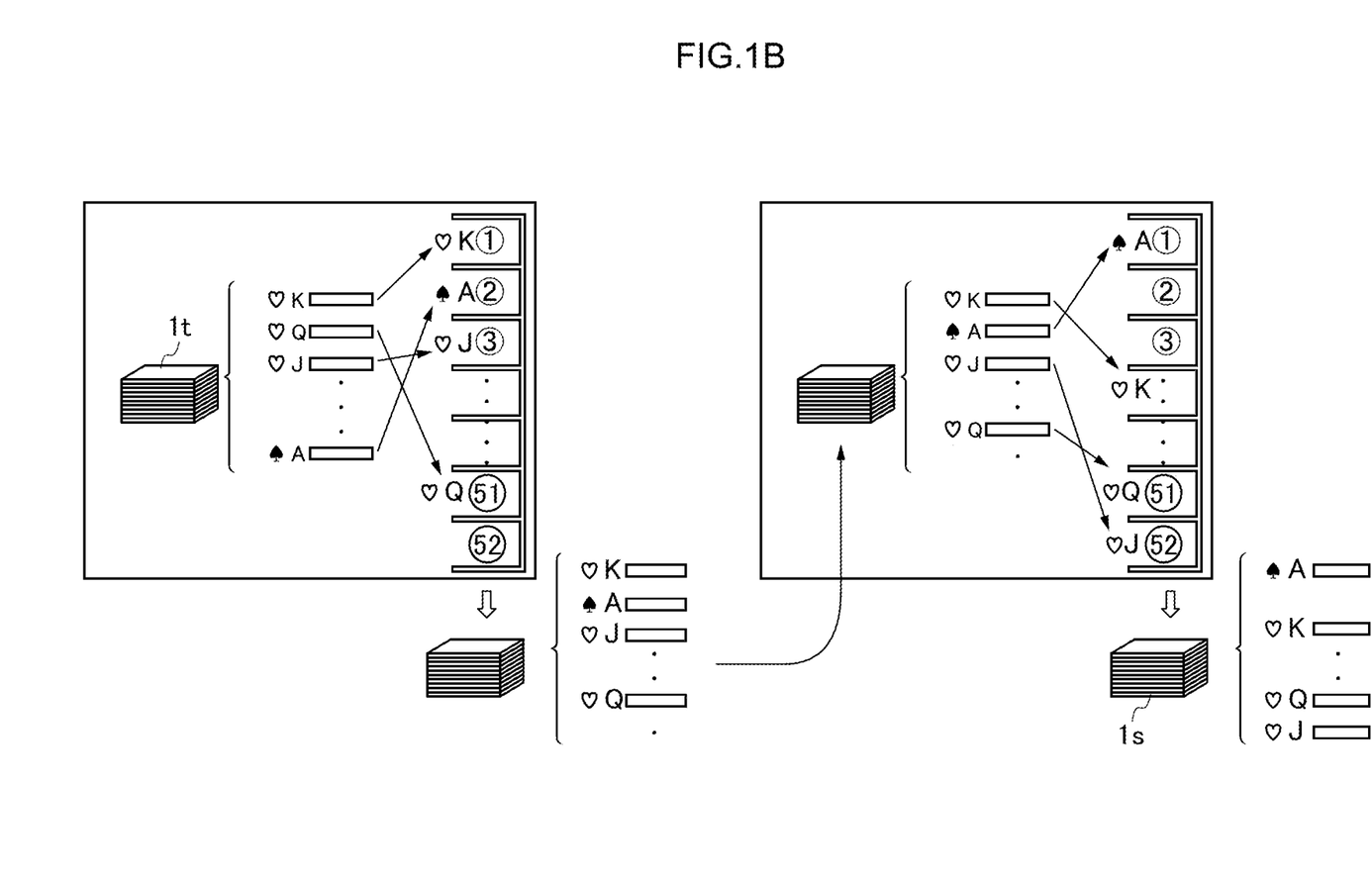
FIG. 1(B) is a diagram illustrating a mechanism in which the cards are arranged randomly by shuffling (when a shuffle is performed multiple times).

Then, as illustrated in FIG. 1(B), it is assumed that multiple shuffling devices are used to perform multiple times a shuffle by which cards are sorted one by one into any of multiple pockets. Thus, similarly, all arrangements of cards can be provided, and the cards can be completely randomly arranged. Note that in this case, the number of pockets may be smaller than the number of cards of the above-described set (for example, 52 pockets in FIG. 1(B)), thereby capable of changing the size of the system. Since multiple shuffling devices are provided, the system is designed to sort each card using sets of random numerical values output from random generators based on commands from the respective different CPUs (processors). The CPUs (processors) are independent from one another, so that each of the CPUs (processors) has only information about a shuffle performed in the corresponding shuffling device which has sorted the cards using a set of random numerical values output from the corresponding random generator based on the command from the CPU itself. Even if the information about the set of random numerical values output from each of the multiple random generators is stolen due to an unauthorized access to the multiple CPUs (processors), or the like, it becomes difficult to identify shuffled cards to which the stolen information is allocated in all the shuffling devices, and therefore the possibility that the arrangement of the shuffled cards is recognized is significantly reduced.

Embodiment 1

Figure 2:
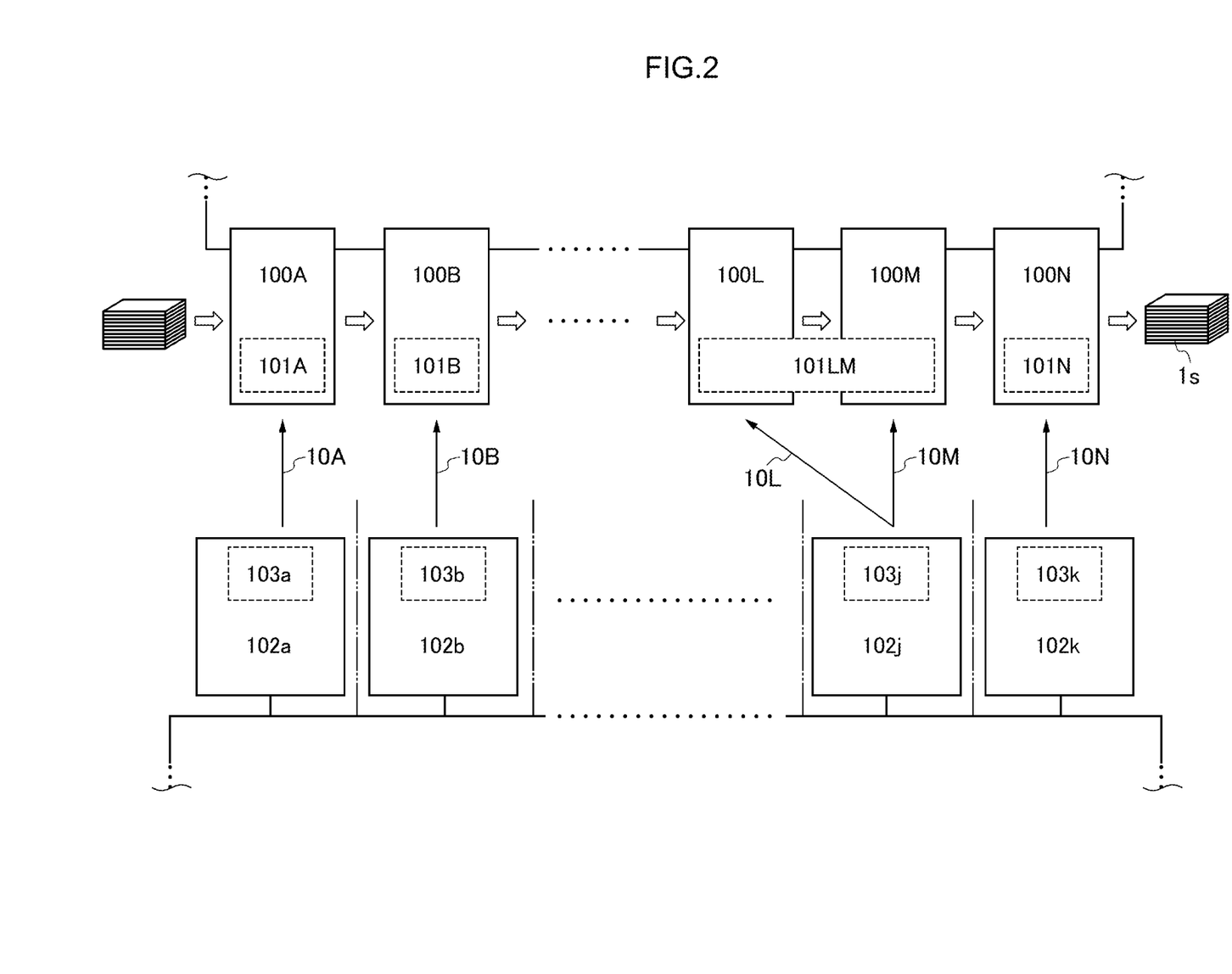
FIG. 2 is a diagram illustrating a schematic configuration of an overall shuffling system of an embodiment of the present invention.

Next, an embodiment of the shuffling system according to the present invention will be described with reference to FIG. 2. FIG. 2 is a diagram illustrating a schematic configuration of an overall shuffling system of the embodiment of the present invention. The shuffling system in the present embodiment includes multiple shuffling devices (100A to 100N), multiple sequencers or controllers (101A to 101N) which are provided inside or outside or connected to the multiple shuffling devices, respectively, so that each of the multiple sequencers or controllers controls a predetermined shuffling device among the multiple shuffling devices, multiple CPUs (processors 102a to 102k) which are independent from one another by disconnecting the communication networks, and random generators (103a to 103k) which are included in the multiple CPUs, respectively, so that each of the random generators outputs a corresponding one of sets (10A to 10N) of random numerical values based on a command from the predetermined CPU. The multiple shuffling devices (100A to 100N) are connected in series to one another, and a set 1t of cards to be shuffled is shuffled by the shuffling device 100A, and then similarly shuffled by the shuffling device 100B to the shuffling device 100N in sequence. That is, the multiple shuffling devices (100A to 100N) are configured to shuffle the same set 1t of cards.

The sets (10A to 10N) of random numerical values output from the respective random generators (103a to 103k) based on the commands from the respective multiple CPUs (processors 102a to 102k) which are independent from one another are transmitted to the respective sequencers or controllers (101A to 101N) which are wiredly or wirelessly connected with the respective multiple CPUs (102a to 102k), and the multiple sequencers or controllers (101A to 101N) uses the respective sets (10A to 10N) of random numerical values received from the respective random generators (103a to 103k) to control the shuffles of the respective shuffling devices (100A to 100N) which are provided with or connected to the respective multiple sequencers or controllers (101A to 101N). Here, as in the CPU 102j in FIG. 2, for example, some CPUs among the multiple CPUs (102a to 102k) may be configured to be involved in the shuffles of some (two or more) of shuffling devices among the multiple shuffling devices, and in this case, the sequencer or controller 101LM may be configured to perform the shuffles of the two shuffling devices (100L and 100M). The multiple shuffling devices (100A to 100N) need not be necessarily arranged linearly as illustrated in FIG. 2, and may have a curved arrangement or a branched arrangement in the middle of connection. In addition, for example, the card set 1t shuffled by the shuffling device 100B may be returned to the shuffling device 100A to be shuffled thereby again. Furthermore, the card set 1t may be shuffled by the same shuffling device 100 multiple times. In other words, for example, the card set 1t shuffled by the shuffling device 100A may be returned to the shuffling device 100A to be shuffled thereby again. In this case, the CPUs or the random generators to be used for the respective shuffles are selected among the multiple CPUs (102a to 102k) or the multiple random generators (103a to 103k) to be switched therebetween, so that the different CPUs or random generators are used to shuffle the cards.

Although the above description is repeated, since the multiple shuffling devices (100A to 100N) are provided, the multiple shuffling devices (100A to 100N) are controlled by the corresponding sequencers or controllers (101A to 101N), respectively, using the sets (10A to 10N) of random numerical values output from the respective random generators (103a to 103k) based on the commands from the respective different CPUs (102a to 102k). Note that on the factory's manufacturing line, while a certain card set 1t is shuffled by the shuffling device 100B after being shuffled by the shuffling device 100A, a subsequent card set 1t is shuffled by the shuffling device 100A, so that the shuffles are performed in sequence. To do so, new sets (10A to 10N) of random numerical values are output from the respective random generators (103a to 103k) in sequence, and then are transmitted to the corresponding sequencers or controllers (101A to 101N), respectively. For example, the random generator 103a outputs and transmits a first set 10A of random numerical values, a second set 10A of random numerical values, a third set 10A of random numerical values, and sequential sets 10A of random numerical values in sequence to the sequencer or controller 101A (the first set 10A of random numerical values, the second set 10A of random numerical values, the third set 10A of random numerical values, and the sequential sets 10A of random numerical values are different from one another). Here, it is assumed that the information about the sets (10A to 10N) of random numerical values output from the respective multiple random generators (103a to 103k) in a certain period of time is stolen due to an unauthorized access to the multiple CPUs (102a to 102k). For example, it is assumed that the information for three sets of the first set 10A, the second set 10A, and the third set 10A of random numerical values as the sets of random numerical values output from the random generator 103a for a certain period of time, and the information for five sets of the first set 10B, the second set 10B, the third set 10B, the fourth set 10B, and the fifth set 10B of random numerical values as the sets of random numerical values output from the random generator 103b for the certain period of time are stolen. In this case, it is not easy to precisely determine whether a certain set 10A of random numeral values (e.g., the first set 10A of random numerical values) is used for shuffle of the card set 1t or for shuffle of the subsequent card set 1t, in the shuffling device 100A. Even if the shuffled card set 1t for which the set 10A of random numerical values (e.g., the first set 10A of random numerical values) is used is identified by someone, the multiple CPUs (102a to 102k) are independent from one another by disconnecting the communication networks, and therefore shuffled card sets 1t for which certain sets of random numerical values output from the random generators corresponding to the other shuffling devices are used cannot be recognized one after another based on the identified information. For example, it cannot be recognized whether the sets 10B of random numerical values (e.g., the first set 10B of random numerical values) output from the random generator 103*b* are used for shuffle of the card set 1*t* or for shuffle of the subsequent card set 1*t* one after another, and therefore it is not easy to precisely determine whether the set 10B of random numerical values (e.g., the first set 10B of random numerical values) is used for shuffle of the card set 1*t* or for shuffle of the subsequent card set 1*t*, as with the set 10A of random numerical values (e.g., the first set 10A of the random numerical values). The information about the arrangement of a card set is shuffled through the multiple shuffling devices (100A to 100N) cannot be obtained unless all the sets (10A to 10N) of random numerical values used for shuffles of the card set is are precisely recognized (for example, unless all the sets of random numerical values such as which number set 10A among the sets 10A of random numerical values, and which number set 10B among the sets 10B of random numerical values are precisely recognized). Therefore, it can be said that it is nearly impossible to obtain the information about the arrangement of the cards.

Figure 3A:
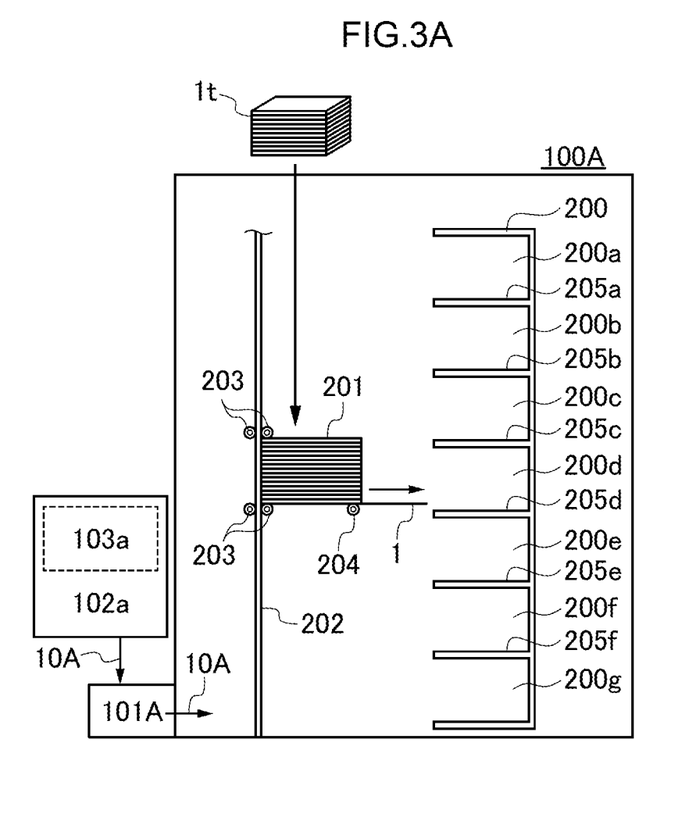
FIG. 3(A) is a diagram illustrating a schematic configuration of a shuffling device of the embodiment of the present invention.

Next, a schematic structure of each shuffling device will be described with reference to FIG. 3(A). FIG. 3(A) is a diagram illustrating a schematic configuration in each shuffling device of the embodiment of the present invention. As illustrated in FIG. 3(A), the shuffling device 100A includes a card stack holder 200, a card feeder 201, a slide rail 202, feeder travel rollers 203, and a card delivery roller 204.

The card stack holder 200 has a predetermined number of pockets 200*a* to 200*g*. Note that, although in the configuration illustrated in FIG. 3(A), it is illustrated that the card stack holder 200 has seven pockets, the card stack holder 200 may have any number of pockets. Movable partition plates 205*a* to 205*f* are installed between the pockets. The card feeder 201 is designed such that when the card set 1*t* to be shuffled is placed on the card feeder 201, the card delivery roller 204 provided on the bottom rotates, sending out a card 1 from the lowermost part of the card feeder 201 toward the card stack holder 200 through a card delivery port (not illustrated) provided in a lower flank of the card feeder 201. Also, the card feeder 201 is configured to be slidable in a vertical (up and down) direction along the slide rail 202 by means of the feeder travel rollers 203 driven by drive means such as a motor (not illustrated).

With the configuration described above, the shuffling device 100A is controlled through the sequencer or controller 101A to alternately slide the card feeder 201 to a position facing any of the pockets 200*a* to 200*g* and send out the card 1 from the card feeder 201 to the pocket (200*a* to 200*g*). Note that, the sequencer or controller 101A receives the set 10A of random numerical values output from the random generator 103*a* based on a command from the CPU 102*a*, and determines the position to move the card feeder 201 to, i.e., the position facing one of the pockets 200*a* to 200*g* using the received set 10A of random numerical values. The sequencer or controller 101A is configured to have a memory (not illustrated) storing a look-up table for assigning any of the pockets 200*a* to 200*g* based on the set 10A of random numerical values. For example, when the first digit of the set 10A of random numerical values is "3," the sequencer or controller 101A controls to move the card feeder 201 to the position facing the third pocket 200*c* from the top based on the look-up table, and send out the first card 1 to the pocket 200*c*. In this way, the card set 1*t* placed on the card feeder 201 is sent out one by one in a random order to any of the pockets 200*a* to 200*g* of the card stack holder 200. When all the cards 1 loaded in the card feeder 201 are sent out to the card stack holder 200, the partition plates 205*a* to 205*f* recede from the inside of the card stack holder 200 and consequently cards 1 sorted into the pockets 200*a* to 200*g* of the card stack holder 200 are taken out of the shuffling device 100A as a single stack. However, as gathering means of the cards 1 sorted into the above pockets 200*a* to 200*g*, the receding of the partition plates 205*a* to 205*f* is not absolutely necessary, and any alternative means may be used. For example, the cards may be taken out of the pockets 200*a* to 200*g* using a robot arm or the like. The above is a single shuffling process performed by the shuffling device 100A.

Note that the structure of the shuffling device is not limited to the above embodiment. For example, it is also conceivable that the shuffling device is of a structure (not illustrated) where after the set of cards to be shuffled is sorted previously into the multiple pockets for each rank and suit, the sequencer or controller controls to perform the shuffle based on the set of random numerical values output from the random generator based on a command from the CPU (processor) so that the cards are taken one by one out of the multiple pockets as a stack. It is only required that the sequencer or controller is wiredly or wirelessly connected to a position at which the shuffling device can be controlled, and therefore the sequencer or controller may be provided inside or outside the shuffling device. Similarly, it is only required that the random generator has a function of receiving the command from the CPU and transmitting the set of random numerical values directly or indirectly to the sequencer or controller, and therefore the random generator may be included in the CPU or in a device separately provided outside.

Figure 3B:
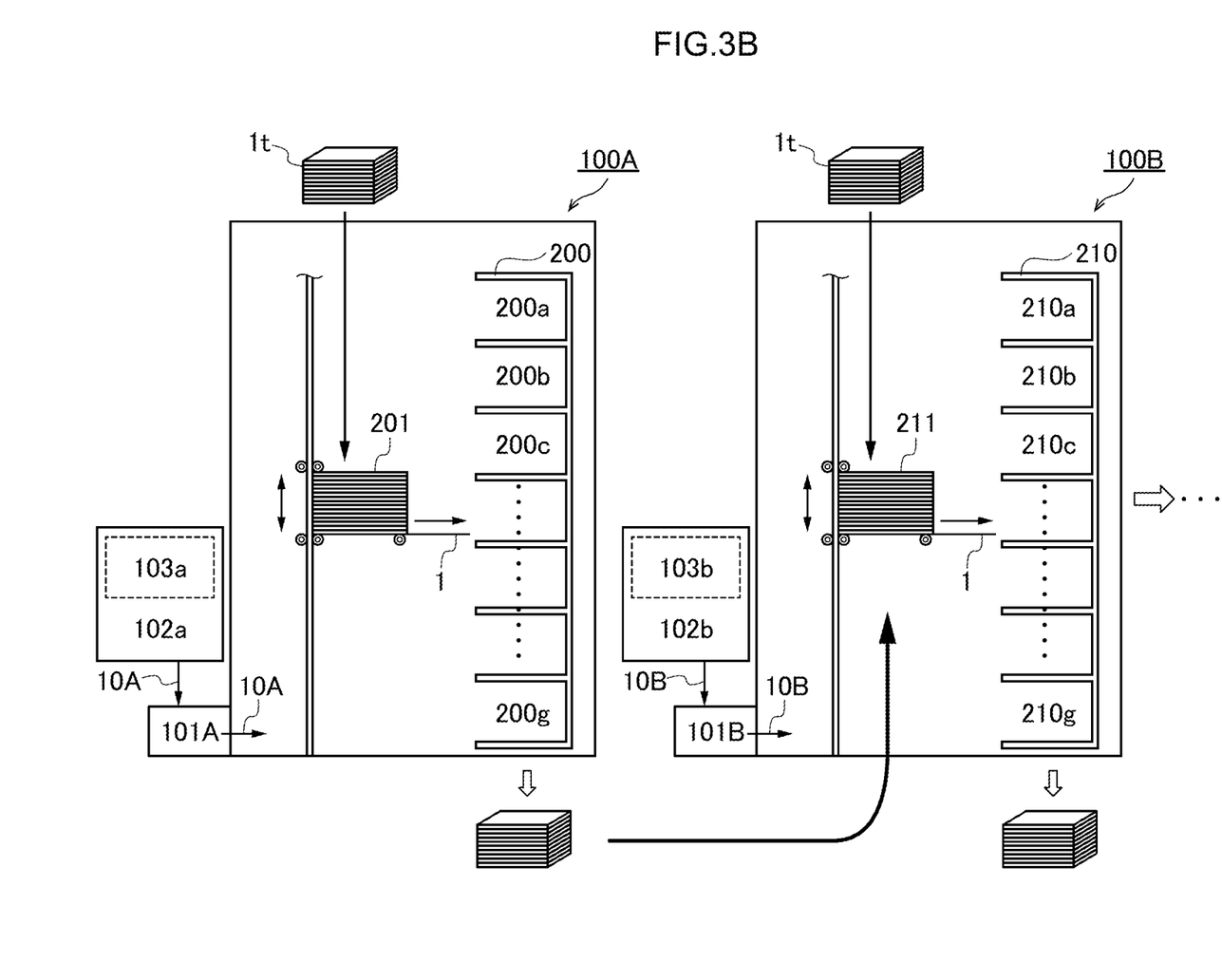
FIG. 3(B) is a diagram illustrating a schematic configuration of a part of a shuffling process of the embodiment of the present invention.

Next, FIG. 3(B) is a diagram illustrating a schematic configuration of a part of a shuffling process in the shuffling system according to the present embodiment, in which the shuffling device 100A having the above configuration and the shuffling device 100B are connected in series to each other, the shuffling device 100B being provided downstream of the shuffling device 100A. Note that although the line with two shuffling devices (a shuffling device 100A, and a shuffling device 100B) is illustrated as an example in FIG. 3(B), the number of shuffling devices in the overall shuffling system of the present invention is not limited to this and may be more than two. In FIG. 3(B), the two shuffling devices have the same structure, but may have different structures, for example, the number of pockets into which the cards 1 are sorted may be different between the two shuffling devices. In FIG. 3(B), the cards 1 sorted into the pockets 200*a* to 200*g* are gathered in the shuffling device 100A and are taken out of the shuffling device 100A as a single stack, and then are sent out to the shuffling device 100B and are sorted into the pockets 210*a* to 210*g* in the shuffling device 100B as with the shuffling device 100A. As another embodiment, for example, the cards 1 sorted into the pockets 200*a* to 200*g* may be sorted as it is into multiple pockets in the subsequent shuffling device without being gathered in the shuffling device 100A as a single stack. In still another embodiment, the cards 1 sorted into the pockets 200*a* to 200*g* in a random order in the shuffling device 100A may be taken one by one out of the multiple pockets in a random order as a stack based on the set 10B of random numerical values output from the random generator 103*b* based on the command from the CPU 102*b*.

Figure 3C:
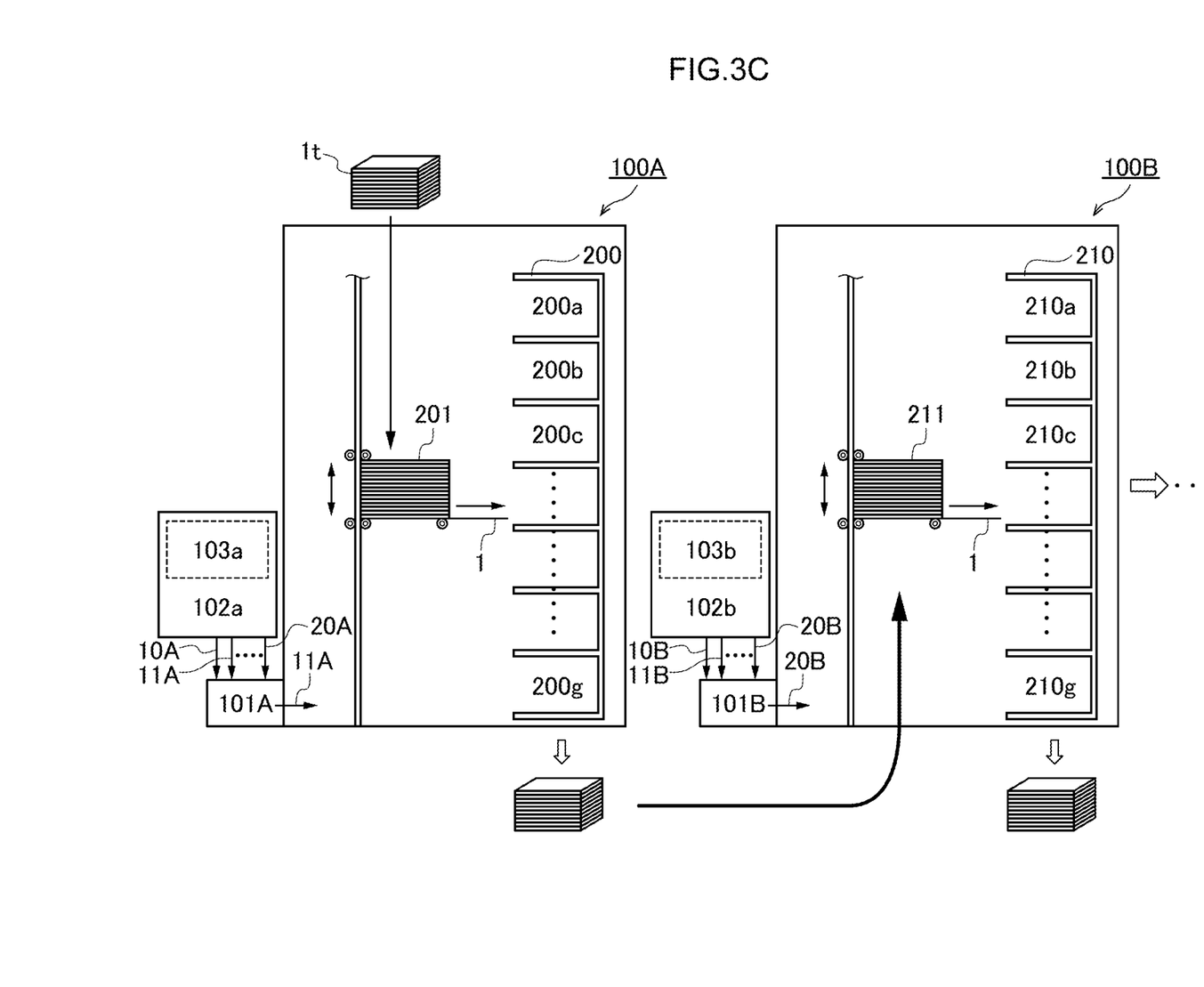
FIG. 3(C) is a diagram illustrating a schematic configuration of a part of a shuffling process of the embodiment of the present invention (when multiple sets of random numerical values are output from a random generator).

Note that, as described above, the multiple sequencers or controllers (101A to 101N) are configured to receive the respective sets of random numerical values (10A to 10N) output from the respective random generators (103*a* to 103*k*) based on the commands from the respective multiple CPUs (102*a* to 102*k*) to control the respective shuffling devices (100A to 100N), and the CPUs (102*a* to 102*k*) are configured to instruct the respective random generators (103a to 103k) to output the respective sets of random numerical values at a time or for each multiple sets at intervals of short time duration so that the multiple sequencers or controllers (101A to 101N) receive the respective sets of random numerical values at a time or for each multiple sets at intervals of short time duration. Each of the multiple sequencers or controllers (101A to 101N) is configured to select one set among the received multiple sets of random numerical values to control the corresponding shuffling device (100A to 100N) using the set of random numerical values selected by the sequencer or controller itself. For example, FIG. 3(C) illustrates a case where the sequencer or controller 101A receives the multiple sets (10A to 20A) of random numerical values from the CPU 102a, selects a set 11A of random numerical values, and controls the shuffling device 100A using this set 11A of random numerical values, and the sequencer or controller 101B receives the multiple sets (10B to 20B) of random numerical values from the CPU 102b, selects a set 20B of random numerical values, and controls the shuffling device 100B using this set 20B of random numerical values. Each CPU (102a to 102k) has the pieces of information for the multiple sets of random numerical values output from the random generator based on a command from the CPU itself. Even if the information about the multiple sets of random numerical values output from the multiple random generators (103a to 103k) is stolen due to an unauthorized access to the multiple CPUs (102a to 102k), or the like, it becomes difficult to identify the set of random numerical values which has been selected by the sequencers or controllers (101A to 101N) and used for the shuffle of the card set 1t, and therefore the possibility that the arrangement of the shuffled card set is 1s recognized is reduced and the security can be further improved. Note that in the present embodiment, when each CPU (102a to 102k) instructs the respective random generators (103a to 103k) to output the respective sets of random numerical values at a time or for each multiple sets at intervals of short time duration, the security is sufficiently kept, and therefore the multiple CPUs (102a to 102k) need not be necessarily independent from one another, and the number of CPUs may be one in the overall shuffling system.

Next, a flow of the cards in a manufacturing process including a shuffling process in the embodiment of the shuffling system of the present invention will be described. A card set 1t including the cards made up of a predetermined number of decks grouped together, the cards being created through a printing process in which suit and rank are printed on one side of card base paper and a design is printed on the other side, and through a cutting process in which the printed card base paper is cut into individual cards, is loaded in the card feeder 201 of the shuffling device 100A in the initial step of the shuffling process. The card set 1t is sent out one by one in a random order to any of the pockets (200a to 200g) of the card stack holder 200 by the sequencer or controller 101A using the set 10A of random numerical values output from the random generator 103a based on the command from the CPU 102a. When all the cards are sent out to the card stack holder 200, the partition plates 205a to 205f recede from the inside of the card stack holder 200 and consequently cards 1 sorted into the pockets 200a to 200g of the card stack holder 200 are taken out of the shuffling device 100A as a single stack.

The card set taken out of the shuffling device 100A as a single stack by the above gathering means is automatically or manually loaded in a card feeder 211 of the shuffling device 100B, is sorted one by one into any of the pockets (210a to 210g) of the card stack holder 210 by the sequencer or controller 101B using the set 10B of random numerical values output from the random generator 103b based on the command from the CPU 102b, and is then shuffled. The similar processes are repeated until the card set reaches the final shuffling device (shuffling device 100N in Embodiment 1) which is provided most downstream of a predetermined number of shuffling devices connected in series to one another. Note that the integrated product of the number of pockets in each shuffling device (100A to 100N) (for example, seven pockets in the shuffling device 100A, and seven pockets in the shuffling device 100B) and the number of all the shuffling devices (100A to 100N) for shuffling the card set 1t is equal to or larger than the total number of cards of the card set 1t (e.g., 416 cards in the case of an 8-deck shuffled playing cards), and finally the cards can be completely randomly arranged. The cards sorted into the multiple pockets in the above-described final shuffling device are automatically or manually taken out of the final shuffling device as a single stack by the gathering means by which the partition plates of the card stack holder recede from the inside of the card stack holder.

Note that it may be checked in each shuffling process whether the card set includes a predetermined number of cards (416 cards in the case of an 8-deck shuffled playing cards). It can be inspected whether the cards are lost in the shuffling processes, or whether some cards are added or removed in the shuffling processes.

Note that when the final shuffling device (in Embodiment 1, the shuffling device 100N which performs the final shuffling process finishes the shuffle, a shuffled card ID to be assigned to the set of shuffled playing cards completed through the final shuffling process is generated. This shuffled card ID is generated as a unique ID for each shuffled playing card set 1s. The generated shuffled card ID is associated with predetermined information out of production information of the shuffled playing card stored in the database (not illustrated). Any desired type and volume of such information may be used, but information which identifies the manufacturing line or shuffling devices involved in the shuffling process is particularly important.

Specifically, if there are multiple manufacturing lines, the manufacturer of the shuffled playing card set is according to the present embodiment assigns a unique manufacturing line ID to each manufacturing line in advance. Then, upon generation of a shuffled card ID, the generated shuffled card ID is registered in the database by associating the shuffled card ID with the manufacturing line ID of the manufacturing line involved in the manufacture of the shuffled playing cards. However, IDs are not limited to such manufacturing line-related IDs. Alternatively, a shuffling device ID may be assigned to each shuffling device in advance and the shuffled card ID may be registered in the database by associating the shuffled card ID with all the shuffling device IDs involved in the shuffling process. Note that the database may be provided either in or outside the shuffling system.

Figure 4:
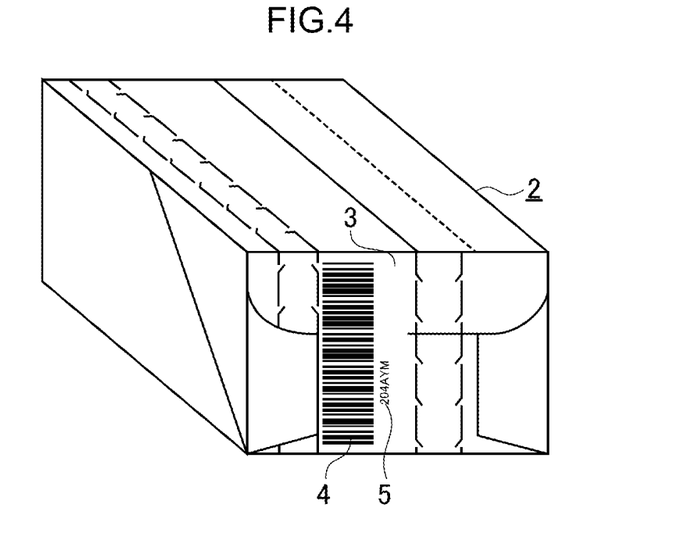
FIG. 4 is a perspective view illustrating an appearance of the shuffled playing cards which are packed and attached with ID, of the embodiment of the present invention.

The generated shuffled card ID is printed on the adhesive label 3 as a bar code 4 by a printing machine. Then, the adhesive label 3 on which the bar code 4 of the shuffled card ID is printed is used to seal a paper box (package) 2. The details will be described later.

Note that as a method of using the ID, for example, if a customer who has purchased a shuffled playing card set is notices any defect in the purchased cards, the customer informs the manufacturer of the shuffled playing card set 1s of the shuffled card ID. In so doing, the customer may send the adhesive label 3 on which the bar code 4 is printed to the manufacturer so that the manufacturer will read the shuffled card ID using a bar-code reader. Alternatively, the customer may read the shuffled card ID using a bar-code reader or the like and send the obtained data to the manufacturer via communications means such as an e-mail. Consequently, by searching the database using the shuffled card ID, the manufacturer can identify a manufacturing line or a shuffling device that may have a problem. In such a case, the manufacturer can alert customers about the shuffled playing card sets 1s manufactured on the same manufacturing line or shuffling device in the same period and take measures, if necessary, such as requesting the customers to discard the product or recalling the product. Also, by inspecting the identified manufacturing line or shuffling device, the manufacturer can prevent a recurrence of the defect.

Also, the manufacturer may deliver the shuffled playing card set is to the customer together with a portable storage medium containing data (shuffled card ID and related information) on the shuffled playing card set is to be delivered by downloading the data from the database. Note that any data structure (format) may be used for the data downloaded from the database to the storage medium as long as the data is readable on the customer's computer. Then, if the customer finds a defect such as a bent card, the customer can read the shuffled card ID of the defective shuffled playing card set is using a bar-code reader or the like and search data on the storage medium based on the shuffled card ID thus acquired. Also, based on search results, the customer can take measures such as discarding shuffled playing card sets is related to the same manufacturing line or shuffling device. Besides, even if fraudulent shuffled playing cade sets are mixed in items delivered to the customer, the customer can check the shuffled card IDs of the delivered items with the shuffled card IDs stored in the storage medium. Then, any shuffled playing card set whose shuffled card ID is not contained in the storage medium provided at the time of delivery can be determined to have been mixed for fraudulent purposes. This prevents mixing of fraudulent items by a third party.

As described above, as illustrated in FIG. 4, the card set is taken out of the final shuffling device as a single stack is automatically encased in a package 2 whose lid is sealed with the adhesive label 3. Note that, although a paper box is used for packaging in this example, the type of packaging is not limited to this. For example, a plastic body may be used alternatively. Instead of a box, the playing cards may be wrapped with a wrapper such as paper or plastic film and sealed with an adhesive label. The point is that the packaging can prevent the seal from being broken open before a game with subsequent cheating such as arranging cards in a different sequence, inserting or removing cards, or marking cards in some way or other.

Note that the present invention includes the shuffling system in which the final shuffling device which finally shuffles the cards of the card set among the multiple shuffling devices further includes the gathering means which mechanically gathers the cards sorted by the final shuffling device, so that the shuffled playing cards are completely manufactured by gathering the sorted cards by the gathering means as a single stack and packing the shuffled card set into a package by an automatic packaging machine (not illustrated).

Note that the present invention includes the shuffling system in which a unique ID is generated for each of the individual shuffled card sets, and is associated with the shuffled card set. The present invention includes shuffled playing cards manufactured using the above-described shuffling system.

The bar code 4 and a specification table 5 are printed on the adhesive label 3. As described above, the bar code 4 represents an ID (shuffled card ID) which can uniquely identify the shuffled playing card set 1s. The specification table 5, which is not absolutely necessary, can contain any information about the playing cards, such as manufacturing information (a product number, a date of manufacture, and manufacturing factory information), a serial number, a product name, a color, and customer information (such as a casino's name). In addition to or instead of the bar code 4, an RFID tag may be attached to the adhesive label 3.

Since the shuffled playing card set is has a mouth of the lid of the package 2 sealed with the adhesive label 3, in order to use the shuffled playing card set 1s, the adhesive label 3 has to be removed or broken. To prevent cheating, preferably the adhesive label 3 is made of material which, once peeled off, cannot be returned to its original attached state or is configured to be broken at least partially upon application of an external force peeling off the adhesive label 3. The shuffled playing cards wrapped with the package by the automatic packaging machine (not illustrated) has a mouth of the lid of the package 2 sealed with the adhesive label 3, and is further wrapped with a transparent shrink film (not illustrated), resulting that the shuffled playing cards are double packed. Thus, the shuffle, the attachment of ID, and the packaging are automatically performed (without being directly touched by a person).

As described above, since the shuffled playing card set 1s contains shuffled playing cards shuffled in a sufficiently random manner and packed individually into the package 2 sealed with the adhesive label 3 in the shuffle system according to the present embodiment, in order to use the shuffled playing card set is in a game, it is only necessary to open the package 2 and set the playing card set is promptly in a card shooter (not illustrated). This eliminates the need for a game host to shuffle the playing cards. It also eliminates the possibility of cheating such as insertion/removal or switching of cards during shuffling.

While various embodiments of the present invention have been described above, the above-described embodiments may be modified by those skilled in the art within the scope of the present invention. The device of the present embodiment may be appropriately modified as required for the game to be applied.

REFERENCE SIGNS LIST

1 Playing card
1t Playing card set before completion of shuffle
1s Playing card set after completion of shuffle
2 Package (paper box)
3 Adhesive label
4 Bar code
5 Specification table
10A Set of random numerical values (10A to 10N: Set of random numerical values)
11A Set of random numerical values (11A to 20A: Set of random numerical values)
11B Set of random numerical values (11B to 20B: Set of random numerical values)
100A Shuffling device (100A to 100N: Shuffling device)
101A Sequencer or controller (101A to 101N: Sequencer or controller)
102a CPU (processor) (102a to 102k: CPU)

103a Random generator (103a to 103k: Random generator)
200 Card stack holder
200a Pocket (200a to 200g: Pocket)
201 Card feeder
202 Slide rail
203 Feeder travel roller
204 Card delivery roller
205a Partition plate (205a to 205f: Partition plate)
210 Card stack holder
210a Pocket (210a to 210g: Pocket)
211 Card feeder

What is claimed is:

1. A shuffling system, comprising:
one or more random generators configured to generate a plurality of random numerical values including a first random numerical value and a second random numerical value;
a first shuffling device configured to shuffle, based on the first random numerical value of the plurality of random numerical values, a card set made up of a plurality of cards; and
a second shuffling device configured to shuffle, based on the second random numerical value of the plurality of random numerical values, the card set shuffled by the first shuffling device;
wherein the first random numerical value and the second random numerical value are managed independently from each other, and
wherein each of the first and second shuffling devices is configured to:
respectively selects one random numerical value from the plurality of random numerical values generated by the one or more random generators, and
conduct shuffling of the card set based on the selected random numerical value.

2. The shuffling system according to claim 1, wherein: the one or more random generators includes:
a first random generator configured to generate the first random numerical value; and
a second random generator configured to generate the second random numerical value.

3. The shuffling system according to claim 1, wherein the first random numerical value and the second random numerical value are managed independently from each other by the first random numerical value and the second random numerical value being generated at different timings.

4. The shuffling system according to claim 1, further comprising:
a first selecting processor configured to select the first random numerical value used by the first shuffling device from the plurality of random numerical values; and
a second selecting processor configured to select the second random numerical value used by the second shuffling device from the plurality of random numerical values independently from the first selecting processor;
wherein the first random numerical value and the second random numerical value are managed independently from each other by the first shuffling device using the first random numerical value selected by the first selecting processor and the second shuffling device using the second random numerical value selected by the second selecting processor.

5. The shuffling system according to claim 1, further comprising:
a checking device configured to check a number of cards of the cards of the card set shuffled by the second shuffling device.

6. The shuffling system according to claim 1, further comprising:
an ID assignor configured to assign an ID to the card set shuffled by the second shuffling device.

7. The shuffling system according to claim 1, further comprising:
a database configured to store an ID assigned to the card set along with information concerning a device involved with the shuffle of the card set.

8. The shuffling system according to claim 1, wherein a product of respective numbers of shuffles performed by all shuffling devices connected in series, including the first and second shuffling devices, multiplied by one another is equal to or larger than a total number of the plurality of cards of the card set.

9. The shuffling system according to claim 1, further comprising:
an assembler; and
an automatic packager;
wherein:
of multiple shuffling devices, including the first and second shuffling devices, a final shuffling device includes the assembler;
the assembler is configured to mechanically gather the plurality of cards shuffled by the final shuffling device; and
the automatic packager is configured to pack the plurality of cards of the card set that have been gathered by the assembler into a package.

10. A shuffling system comprising:
a card set that is shuffled by the shuffling system of claim 1; and
an automatic packager configured to pack the shuffled card set into a package.

11. The shuffling system according to claim 10, wherein the automatic packager is configured to double-pack the shuffled card set.

12. A shuffled card set comprising:
a card set that is shuffled by the shuffling system of claim 1.

13. The shuffled card set according to claim 12, wherein the card set that is shuffled is in a package as packaged by an automatic packager.

14. The shuffled card set according to claim 13, wherein the card set that is shuffled is double-packed.

15. The shuffling system according to claim 1, wherein the first random numerical value includes a first set of random numerical values, the second random numerical value includes a second set of random numerical values, and the first set of random numerical values is different from the second set of random numerical values.

16. A shuffling system comprising:
a plurality of shuffling devices;
a plurality of sequencers or controllers, wherein each of the plurality of sequencers or controllers is configured to control operations of a respective one of the plurality of shuffling devices; and
a plurality of processors, each processor of the plurality of processors configured to control a respective sequencer or controller of the plurality of sequencers or controllers; and wherein:
each processor of the plurality of processors includes a respective random generator configured to generate a plurality of random numerical values; and
each sequencer or controller of the plurality of sequencers or controllers is configured to select and use one random numerical value from the plurality of random numerical values to control the respective shuffling device of the plurality of shuffling devices to shuffle a single set of cards made up of one or more decks.

17. The shuffling system according to claim 16, wherein a respective number of shuffles performed by each of the plurality of shuffling devices is set so that a product of the respective numbers of the shuffles of all of the plurality of shuffling devices multiplied by one another is equal to or larger than a total number of the cards of the set of cards.

18. The shuffling system according to claim 16, wherein:
each processor of the plurality of processors is configured to output the plurality random numerical values obtained using the respective random generator of the processor; and
each sequencer or controller of the sequencers or controllers is configured to receive the plurality of random numerical values from the respective processor.

19. The shuffling system according to claim 16, wherein:
of the plurality of shuffling devices, a final shuffling device includes an assembler;
the assembler is configured to mechanically gather and stack the single set of cards shuffled by the final shuffling device; and
the shuffling system includes an automatic packager configured to pack the set of gathered and stacked cards into a package.

20. The shuffling system according to claim 19, wherein the shuffling system is configured to generate a unique ID and associate the unique ID with the shuffled set of cards.

21. A set of shuffled playing cards manufactured using the shuffling system according to claim 19.

22. The set of shuffled playing cards according to claim 21, wherein the set of shuffled playing cards is double-packed by the automatic packager.

23. A shuffling system comprising:
a plurality of shuffling devices;
a plurality of sequencers or controllers configured to control operations of respective ones of the plurality of shuffling devices independently of one another; and
a processor configured to control the plurality of sequencers or controllers,
wherein:
the processor includes a random generator configured to generate a plurality of random numerical values;
the processor is configured to output the plurality of random numerical values generated by the random generator; and
each of the sequencers or controllers is configured to select and use one random numerical value from the plurality of random numerical values to control the shuffling device corresponding to the sequencer or controller to shuffle a single set of cards made up of one or more decks.

24. The shuffling system according to claim 23, wherein a respective number of shuffles performed by each of the plurality of shuffling devices is set so that a product of the respective numbers of the shuffles of all of the plurality of shuffling devices multiplied by one another is equal to or larger than a total number of the cards of the set of cards.

25. The shuffling system according to claim 23, wherein:
each of the sequencers or controllers is configured to receive the plurality of random numerical values.

26. The shuffling system according to claim 23, wherein:
of the plurality of shuffling devices, a final shuffling device includes an assembler;
the assembler is configured to mechanically gather and stack the single set of cards shuffled by the final shuffling device; and
the shuffling system includes an automatic packager configured to pack the set of gathered and stacked cards into a package.

27. The shuffling system according to claim 26, wherein the shuffling system is configured to generate a unique ID, and associate the unique ID with the shuffled set of cards.

28. A set of shuffled playing cards manufactured using the shuffling system according to claim 26.

29. The set of shuffled playing cards according to claim 28, wherein the set of shuffled playing cards is double-packed by the automatic packager.

* * * * *